United States Patent [19]

James

[11] Patent Number: 4,703,418
[45] Date of Patent: Oct. 27, 1987

[54] METHOD AND APPARATUS FOR PERFORMING VARIABLE LENGTH DATA READ TRANSACTIONS

[75] Inventor: David V. James, Palo Alto, Calif.

[73] Assignee: Hewlett-Packard Company, Palo Alto, Calif.

[21] Appl. No.: 750,377

[22] Filed: Jun. 28, 1985

[51] Int. Cl.⁴ .............................................. G06F 9/34
[52] U.S. Cl. ..................................................... 364/200
[58] Field of Search ... 364/200 MS File, 900 MS File

[56] References Cited

U.S. PATENT DOCUMENTS

| 4,038,642 | 7/1977 | Bouknecht | 364/900 |
| 4,272,815 | 6/1981 | Kadowaki et al. | 364/200 |
| 4,414,626 | 11/1983 | Arai et al. | 364/200 |
| 4,644,463 | 2/1987 | Hotchkin et al. | 364/200 |

FOREIGN PATENT DOCUMENTS 0055623 7/1982 European Pat. Off. .

OTHER PUBLICATIONS

IBM Tech. Disc. Bulletin, R. A. Smith, et al., "Parallel Microprocessor I/O Operation", vol. 22, No. 7, Dec. 1979, pp. 2715–2716.
IBM Technical Disc. Bulletin by R. E. Birney, "Directorized Data Descriptor", vol. 21, No. 7, Dec. 1978, pp. 2653–2659.

*Primary Examiner*—Raulfe B. Zache
*Attorney, Agent, or Firm*—Douglas L. Weller

[57] ABSTRACT

A method and apparatus for performing variable length data read transactions is presented in accordance with a preferred embodiment of the present invention. An input/output (I/O) device which performs variable length data read transactions, such as one which includes a terminal, has associated with it a command linked list, located in system memory, in which a system processor or memory controller has placed command elements. For read transactions, each element typically specifies the place in system memory where data will be transferred, and the number of bytes of data to be transferred. The I/O device autonomously fetches elements on the linked list and executes them. As bytes are being transferred from the I/O device to system memory a residual byte count is kept by the I/O device. When the I/O device has completed the data transfer, it may interrupt or otherwise provide the system processor with status information as to the data transfer. Additionally, the system processor may terminate a data transfer by sending a special flush command to the I/O device. Upon receipt of the flush command, the I/O device stops the data transaction, and returns to the system processor the residual byte count. The residual byte count is used by the system processor to determine how many bytes of information were transferred to system memory.

5 Claims, 6 Drawing Figures

METHOD AND APPARATUS FOR PERFORMING VARIABLE LENGTH DATA READ TRANSACTIONS

BACKGROUND

High performance computer peripherals use direct memory access (DMA) to efficiently transfer data from a peripheral device to a computer memory. However, when the computer peripheral is a terminal there are special problems involved in the implementation of DMA transfers. Particularly, the amount of data an operator of the terminal desires to transmit typically cannot be accurately predicted by a system processor.

In the prior art, various schemes have been used to implement data transfers using terminals. For instance, a first-in-first-out (FIFO) buffer may be used to receive data from a terminal. The system processor may then periodically poll the FIFO buffer, and process any available data. This scheme, however, requires memory space on the interface between the terminal and the system processor. Also, this polling implementation is somewhat less efficient than DMA transfers.

A second scheme used in the prior art is for the terminal to interrupt the system processor to handle every character. This scheme may be disadvantageous in that a large portion of system processor time can be consumed if each character is individually processed. Interrupting per character can be especially consumptive of processor time when a system processor is servicing several terminals simultaneously.

A third scheme used in the prior art is for a terminal to transfer blocks of characters, which are delimited by special characters (for instance, a carriage return). This scheme, however, may not be used in conjunction with certain operating systems, such as UNIX, which allow application programs to process individual characters from a terminal as they are received.

SUMMARY OF THE INVENTION

In accordance with the preferred embodiment of the present invention a method and apparatus for performing variable length data read transactions is presented. An input/output (I/O) device which performs variable length data read transactions, such as one which includes a terminal, has associated with it a command linked list, located in system memory, in which a system processor or memory controller has placed command elements. For read transactions, each element typically specifies the place in system memory where data will be transferred, and the number of bytes of data to be transferred.

The I/O device autonomously fetches elements on the linked list and executes them. As bytes are being transferred from the I/O device to system memory a residual byte count is kept by the I/O device. When the I/O device has completed the data transfer, it may interrupt or otherwise provide the system processor with status information as to the data transfer.

Additionally, the system processor may terminate a data transfer by sending a special flush command to the I/O device. Upon receipt of the flush command, the I/O device stops the data transaction, and returns to the system processor the residual byte count. The residual byte count is used by the system processor to determine how many bytes of information were transferred to system memory. When the I/O device has finished responding to the flush command, it again starts up data transfers to system memory.

The above scheme for performing variable length data read transactions frees a system processor to specify the length of expected data transfer from an I/O device and also gives the system processor flexibility to terminate the transfer if the amount of data is less than expected, or if the system processor wants to begin processing of data already collected.

DESCRIPTION OF THE PREFERRED EMBODIMENT

Figure 1:
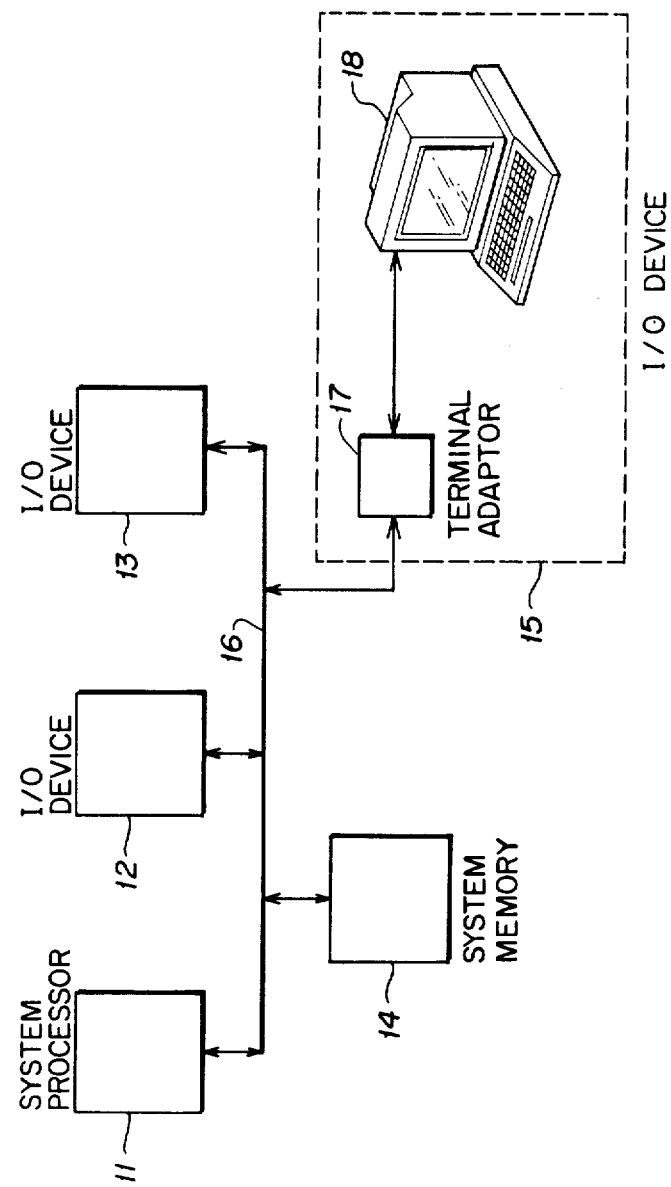
FIG. 1 shows a system processor, system memory, and various I/O devices coupled to a bus, in accordance with a preferred embodiment of the present invention.

In FIG. 1, a system processor 11, a system memory 14, an I/O device 12, an I/O device 13, and an I/O device 15 are shown coupled to a bus 16. I/O device 15 includes a computer terminal 18 and a direct memory access terminal adaptor 17.

Figure 2:
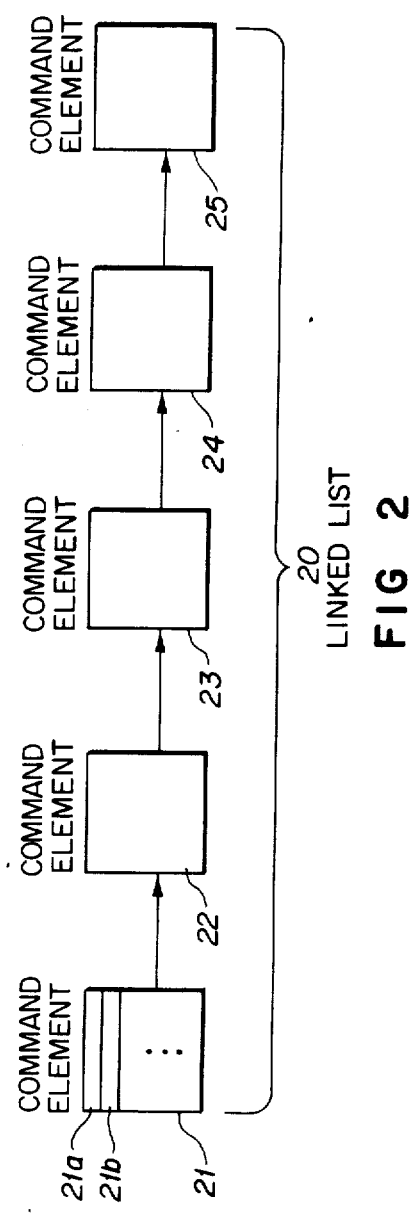
FIG. 2 shows a plurality of elements on a linked list in accordance with the preferred embodiment of the present invention.

In order for system processor 11 to obtain data from terminal 18, it constructs a linked list of command elements in system memory 14. For example, a linked list 20 consisting of command elements 21, 22, 23, 24 and 25 is shown in FIG. 2. Each command element 21-25 includes a pointer representing an address in system memory 14 where data is to be transferred. Each command element 21-25 also includes a counter representing the number of bytes (or word or some other unit of data having a specified amount of data) to be transferred. For example, in command element 21 is shown a register 21a for storing a pointer, and a register 21b for storing a counter. Once linked list 20 has been constructed, system processor 11 transfers to terminal adaptor 17 the address in memory of the first element in linked list 20, in this case element 21. Additionally, system processor 11 transfers to terminal adaptor 17 a command which causes terminal adaptor 17 to fetch and execute in order command elements 21-25. Starting with element 21, terminal adaptor 17 transfers the contents of each command element into registers within terminal adaptor 17.

Figure 3A:
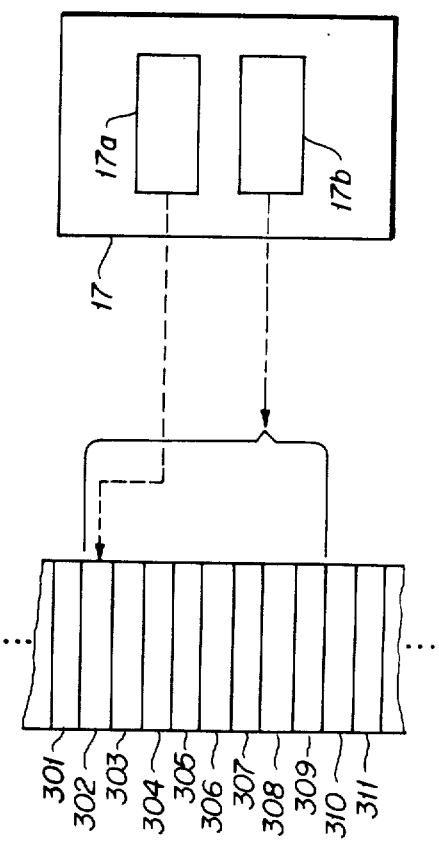
FIGS. 3A, 3B, and 3C show a portion of system memory and an I/O device in accordance with the preferred embodiment of the present invention.
Figure 3B:
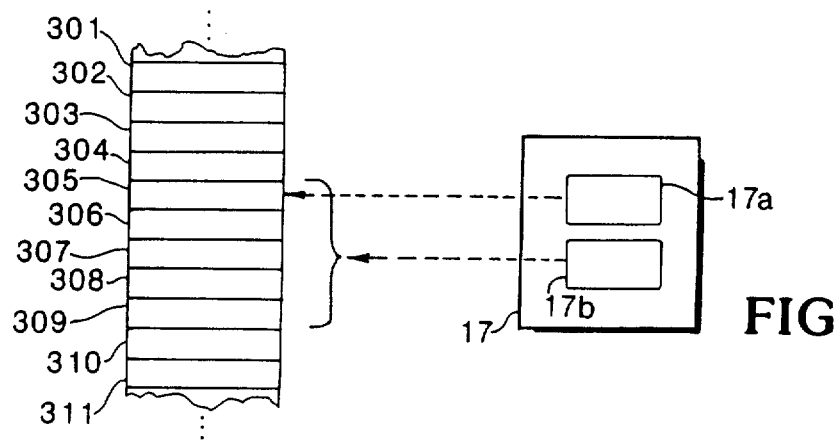
Figure 3C:
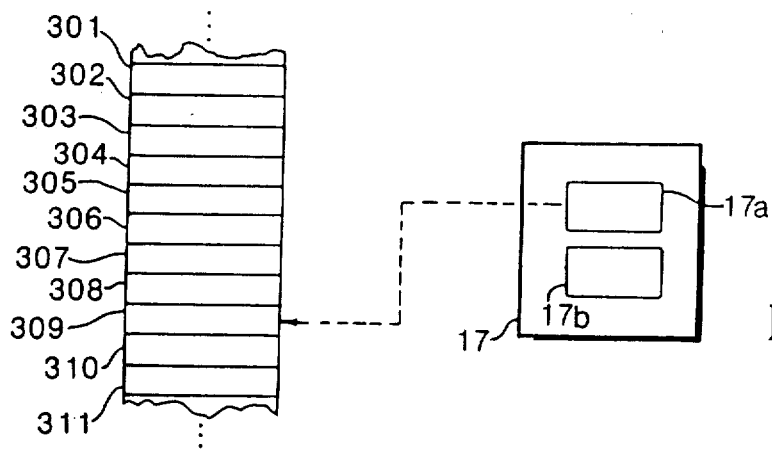

FIG. 3A, FIG. 3B, and FIG. 3C show memory locations 301-311 within system memory 14 and show changes in the content of registers within terminal adaptor 17 which occur during a DMA transfer of data from terminal adaptor 17 to system memory 14. For example, terminal adaptor 17 fetches element 21 and stores the pointer currently in register 21a into a register 17a and the counter currently in register 21b into a register 17b. The result is shown in FIG. 3A where the contents of register 17a point to a location 302 in system memory 14 and where the contents of register 17b indicate terminal adaptor 17 is to transfer 8 bytes of data.

As each byte is transferred from terminal adaptor 17 to system memory 14 the pointer in register 17a is incremented to point to the next location in system memory 14, and the counter in register 17b is decremented to indicate the number of bytes left to transfer.

In FIG. 3B, three bytes of data have been transferred. The pointer in register 17a now points to memory location 305, and the counter in register 17b indicates there are five remaining bytes to be sent. Before terminal adaptor 17 has transferred the entire eight bytes, terminal adaptor 17 may receive from system processor 11 a data flush command. Upon receipt of the data flush command, terminal adaptor 17 will stop its DMA transfer to system memory 14 and will send to system processor 11 the counter in register 17b, which indicates to system processor 11 the amount of data transferred. At the time shown in FIG. 3B, the counter in register 17b would indicate there are five bytes remaining to be sent. System processor 11 can then process the bytes of data already transferred to system memory 14. Terminal adaptor 17 will fetch the next command element, in this case, command element 22, and continue transferring data.

On the other hand, terminal adaptor 17 may transfer the entire eight bytes without receiving a data flush command, as shown in FIG. 3C. Terminal adaptor 17 will then notify system processor 11 that the eight bytes have been transferred. This notification can be done by interrupting the processor to deliver the information, or by some other means.

Figure 4:
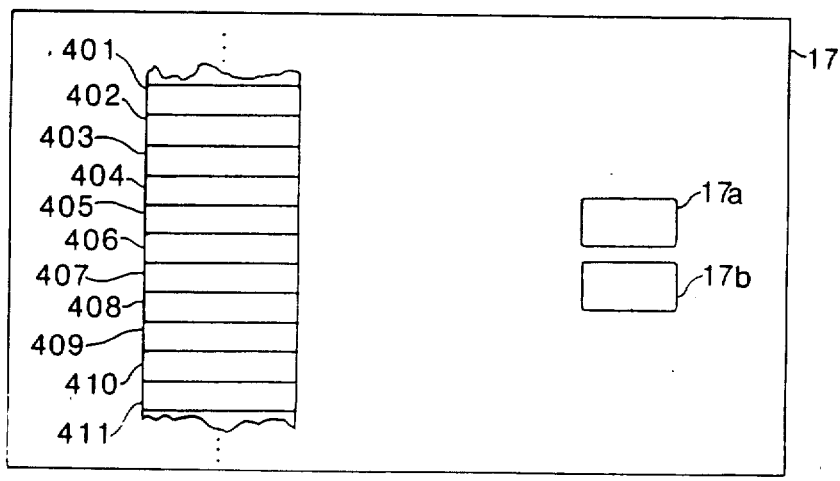
FIG. 4 shows a portion of an I/O device in accordance with a second preferred embodiment of the present invention.

In FIG. 4, an alternate embodiment is shown. Here memory locations 401-411 are shown to be within terminal adaptor 17. In the implementation shown in FIG. 4, data from terminal 18 is buffered in memory locations 401-411 within terminal adaptor 17 until the counter in register 17b is zero, until all memory locations (represented in FIG. 4 by memory locations 401-411) within terminal adaptor are filled, or until terminal adaptor 17 receives a data flush command from system processor 11. In either case, terminal adaptor 17 then writes to system memory 14 the data in memory locations 401-411 which terminal adaptor 17 has received from terminal 18. Terminal adaptor 17 will then fetch the next command element from linked list 20. Terminal adaptor 17 will then continue to receive data from terminal 18 into memory locations 401-411.

I claim:

1. A method for receiving input from a input/output device comprising:
   providing a plurality of consecutive memory locations for receiving data from the input/output device;
   providing to the input/output device an address of at least one of the plurality of memory locations;
   providing to the input/output device a count which specifies how many memory locations are in the plurality of memory locations;
   providing a command to the input/output device to terminate transfer of data to the plurality of memory locations; and,
   receiving information as to how many of the plurality of consecutive memory locations received data from the input/output device.

2. A method as in claim 1 additionally comprising the step of placing the address and the count in a linked list of data entries consisting of memory locations.

3. A method utilizing a system processor to oversee a transfer of data from a first device to a system memory, the method comprising:
   sending a command instruction from the system processor to the first device, the command instruction specifying a location in the system memory where data is to be transferred, and a unit count which indicates how much data is to be transferred;
   transferring data from the first device to the system memory;
   sending a second command instruction from the system processor to the first device, the command instruction the first device to stop transferring data from the first device to the system memory; and,
   sending status information from the first device to the system processor, the status information indicating how much data was transferred from the first device to the system memory.

4. A method utilizing a system processor to oversee a transfer of data from a first device to a system memory, the method comprising:
   sending a command instruction from the system processor to the first device, the command instruction specifying a location in the system memory where data is to be transferred, and a unit count which indicates how much is to be transferred;
   buffering data within the first device;
   sending a second command instruction from the system processor to the first device, the command instruction instructing the first device to transfer buffered data from the first device to the system memory; and,
   sending status information from the first device to the system processor, the status information indicating how much data was transferred from the first device to the system memory.

5. An apparatus for performing variable length data transactions from a first device to a system memory within a processor, the apparatus comprising:
   buffering means to receive data from the first device;
   control means, coupled to the buffering means, for specifying to the buffering means a location in the system memory where data is to be transferred and a unit count which indicates how much data is to be transferred, and for specifying to the buffering means to transfer data it has received from the first device; and,
   wherein when the control means specifies to the buffering means to transfer data it has received from the first device, the buffering means indicates to the processor how much data has been transferred from the first device to the buffering means.

* * * * *